UNITED STATES PATENT OFFICE.

THE SIMPSON WATER PROOF MANUFACTURING COMPANY, OF NEW YORK, N. Y., ASSIGNEE, BY MESNE ASSIGNMENTS, OF EDWIN L. SIMPSON.

IMPROVEMENT IN COMPOSITIONS FOR WATERPROOFING AND COATING FABRICS.

Specification forming part of Letters Patent No. 38,005, dated March 24, 1863; Reissue No. 1,721, dated July 5, 1864.

*To all whom it may concern:*

Be it known that EDWIN L. SIMPSON, of Bridgeport, in the county of Fairfield and State of Connecticut, has invented a new and Improved Water-Proof Compound; and I do hereby declare the following to be a full, clear, and exact description of the same.

The invention consists, first, in producing what is termed "liquid gutta-percha"—that is, gutta-percha brought into a liquid state by the application of any solvent which is capable of retaining the gutta-percha in solution; second, in the compound produced by combining with the liquid gutta-percha boiled vegetable oil, camphene, and benzine, or their equivalents, which, when applied, will render fabrics or other articles to which it is applied impervious to air or water and free from the offensive odors arising from vulcanizing compounds or vulcanized goods; third, in a varnish or finishing coat for the water-proof compound, produced by combining with linseed or other drying oil red lead, acetate of lead, and camphene, or their equivalents.

To enable others skilled in the art to prepare and apply my compound, I will proceed to fully describe the method of so doing.

I first form the liquid gutta-percha in the following manner, to wit: I melt together in a covered vessel two parts of gutta-percha and three parts of camphene or naphtha (by naphtha I mean the light products from coal-oil or petroleum which are generally known in commerce as "naphtha," "benzine," "carbon spirits," &c.) over a slow fire, or such a one as will not cause the vapor from the camphene to escape so fast as to waste or take fire, agitating it occasionally until completely combined. I then set it from the fire to settle and cool. If the liquid is to be used in forming a compound of light or delicate tints, when partially cooled I add more camphene or naphtha, as the thinner the liquid the more perfectly will the impurities separate when permitted to settle, which by experiment I find is best done in the sun in glass vessels by standing from seven to ten days; but when less purity of the liquid is required, artificial heat not exceeding 120° Fahrenheit may be used to advantage. I next prepare the compound which is to be applied for waterproofing purposes. I boil (or otherwise concentrate) linseed or other suitable vegetable oils over a slow fire until it attains the consistency of jelly, when it should be removed and allowed to cool until camphene or naphtha may be added without igniting. Then to four gallons of the concentrated oil I add one ounce of cleansed benzine, and immediately incorporate therewith, by stirring or similar agitation, three gallons of camphene or naphtha and three gallons of the liquid gutta-percha. I find by experiment that it requires more or less of the camphene or naphtha according to the purpose for which the compound is to be used, whether for black or for light, delicate tints—more in proportion as the tints are to be more delicate. When black is the color desired, I mix lamp-black in the oil in such proportions as will make the black required, and when other colors are required the requisite coloring-matter must be used instead of the lamp-black. I also find by experiment that less of camphene or naphtha is required when I mix the compound by grinding between iron rollers than is necessary when I mix by stirring or agitation, as the grinding process softens the consistency very much more than any other process I have as yet tried.

When the compound is thus prepared and thoroughly cool, or not above 70° Fahrenheit, I apply it to such fabrics or articles as I desire to render impervious to air or water in one or more coats, as the case may require. I apply it to cloths by the apparatus known as the "Mackintosh spreader," or any other answering the same purpose. For ordinary cloths (cotton) I find three coats are sufficient, and two coats on silk or thin goods. After the goods are thus coated, I hang them in a room heated to about 160° Fahrenheit until they become thoroughly dry. I then apply the varnish, or finishing-coat compounded as follows: I take one gallon of linseed or any other drying oil, four ounces red lead, one ounce of acetate of lead, or their equivalents. I boil them together in a vessel of about four or five gallons capacity until it will "string" two or three inches. Then remove it from the fire, and when it has cooled sufficiently to permit it I add one quart of camphene or naphtha and one quart of the liquid gutta-percha. Any desired color may be obtained by adding to this varnish the requisite coloring-pigments. I apply this varnish or finishing-coat in the same or similar manner as I do the compound before described.

I thus produce the compound without sulphur or any vulcanizing process or compound, which is one of its chief advantages, as the compound or the articles to which it is applied has none of the offensive odor arising from or always attending vulcanizing compounds and vulcanized goods.

The oil is truly a drying-oil; but the ingredients I use and compound with it alone make it valuable as a finishing-coat or varnish. One other object which I have in thus compounding the varnish or finishing-coat is that by applying clear camphene or spirits of turpentine to the coat after it has been dried it will soften and become adhesive, so that I am enabled to "flock" any of the coated materials after the varnish has become dry, though I prefer to apply the flocks before the varnish has become dry; yet I often find that my ability to soften the varnish is a great convenience.

Heretofore gutta-percha has been applied while in a heated melted state, to which operation there are many objections too apparent to require enumeration here. By the use of the liquid gutta-percha I am enabled to apply it in a liquid state and cold, whereby I overcome those objections and greatly multiply the uses to which gutta-percha may be applied. It will be noticed that I have named camphene or naphtha as the solvents for gutta-percha. I do this, believing either or its equivalent to be the best adapted to that object, yet there are other solvents perhaps equally as good, and some may be better. Therefore I do not confine myself to either or their equivalents.

I am aware that boiled or drying oils have been used in water-proof compounds; but in all cases it has been required that sulphur should form one of the ingredients, as in the patent of Wm. F. Shaw, August 12, 1856, where "it is essential that sulphur be present for the oil to combine with." As much may be said of Park's English Patent Specification No. 2,359 of 1855, where chloride of sulphur is required to produce the result specified. Therefore I do not claim the use of drying-oils when combined with sulphur, sulphureted compounds, or sulphureted goods or fabrics; but What I do claim as the invention, and desire to secure by Letters Patent, is—

1. The liquid produced by dissolving gutta-percha by means of naphtha or carbon spirits, substantially in the manner described.

2. The compound produced by combining camphene, benzine, and boiled vegetable oil, or their equivalents, with liquid gutta-percha, in the manner and for the purpose herein set forth.

3. The varnish or finishing-coat produced in the manner described.

SIMON STEVENS,
*President Simpson Water Proof Mfg. Co., assignee of Edwin L. Simpson, and J. W. Post and C. C. Post.*

Witnesses:
WM. D. S. MANICE,
J. FRANKLIN REIGART.
Attest:
HENRY M. DAKIN,
*Secretary.*